US009841880B1

(12) United States Patent
Beaty

(10) Patent No.: US 9,841,880 B1
(45) Date of Patent: Dec. 12, 2017

(54) SYSTEM, METHOD, AND SOFTWARE PRODUCT FOR ENABLING USERS TO CREATE GRAPHICALLY CONSISTENT BADGES

(71) Applicant: RedCritter Corp, Lewisville, TX (US)

(72) Inventor: Robert M Beaty, Flower Mound, TX (US)

(73) Assignee: RedCritter Corp., Flower Mound, TX (US)

( * ) Notice: Subject to any disclaimer, the term of this patent is extended or adjusted under 35 U.S.C. 154(b) by 556 days.

(21) Appl. No.: 14/171,733

(22) Filed: Feb. 3, 2014

Related U.S. Application Data

(60) Provisional application No. 61/759,831, filed on Feb. 1, 2013.

(51) Int. Cl.
*G06F 3/0484* (2013.01)

(52) U.S. Cl.
CPC .................. *G06F 3/0484* (2013.01)

(58) Field of Classification Search
CPC ...................................... G06F 3/0484
USPC .......................... 716/771; 715/771
See application file for complete search history.

(56) References Cited

U.S. PATENT DOCUMENTS

| | | | | |
|---|---|---|---|---|
| 6,031,532 A * | 2/2000 | Gourdol | ............ | G06F 3/04817 345/629 |
| 2007/0230828 A1* | 10/2007 | Ignatchenko | ............ | G06T 3/40 382/298 |
| 2009/0144651 A1* | 6/2009 | Sprang | ................ | G11B 27/034 715/800 |
| 2011/0013211 A1* | 1/2011 | Grosz | ................ | G06F 17/3028 358/1.9 |
| 2013/0086484 A1* | 4/2013 | Antin | .................... | G06Q 10/10 715/751 |
| 2013/0111324 A1* | 5/2013 | Kern | .................... | G06F 17/218 715/230 |

* cited by examiner

*Primary Examiner* — Kieu Vu
*Assistant Examiner* — Darrin Hope
(74) *Attorney, Agent, or Firm* — Brian Tucker; Kirton McConkie

(57) ABSTRACT

We disclose a system, method and software product for generating custom badges by users. A website presents to the user a badge creating dashboard, predefined color themes, predefined image frames, an badge editing canvas and image transformation tools. A user enters a user chosen image into the badge creating canvas. The user chooses a color theme and uses the image transformation tools to select portions of the image for viewing, and arranges the image in the image canvas for viewing. When the user is satisfied with the badge preview, the user sends a save request which is transferred from the browser to a server. The server generates the custom badge by applying the user chosen theme to the user chosen image. The custom badge is then saved for future retrieval by the user.

20 Claims, 8 Drawing Sheets

SYSTEM, METHOD, AND SOFTWARE PRODUCT FOR ENABLING USERS TO CREATE GRAPHICALLY CONSISTENT BADGES

RELATED APPLICATIONS

The present patent document claims the benefit of priority to Provisional Patent Application No. 61/759,831, filed Feb. 1, 2013, and entitled "System and Method for Enabling End Users to Create Graphically Consistent Icons" the entire contents of each of which are incorporated herein by reference.

COPYRIGHT NOTICE

A portion of the disclosure of this patent document contains material which is subject to copyright protection, specifically, all program code supplied on CD ROMs associated with this application are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Businesses and individuals are increasingly utilizing social media platforms for marketing, employee recognition, and otherwise. Websites such as Facebook, Twitter, Four-Square, SalesForce, LinkedIn, and others allow companies and individuals to create profiles. Often, these sites allow a user to display on its profile certain indications referred to commonly as "badges." Badges indicate to viewers that the owner of the profile has performed various tasks, visited various websites, or earned awards. Users may also use badges to indicate where they work, their hobbies, and establishments or products they enjoy.

Many social media platforms provide a selection of pre-determined badges for users to choose from or earn. If an individual or business wishes to make its own custom badge, that individual must either have advanced design skills or must hire a skilled designer to create the badge. Designing a badge is time consuming and expensive. Online research shows that custom badge development can cost upwards of $25,000. Due to the time and expense involved, individuals and companies find it relatively prohibitive to create their own badges for social media use. Additionally, software developers desiring to integrate badges into software programs may find doing so cost or time prohibitive.

BRIEF SUMMARY

A system, method, and software product for generating a custom badge by a user. The method includes providing a computer processing means, a computer readable medium, and a user interface. A user loads a user chosen image into a badge editing canvas of a browser. The user selects a predefined theme and a predefined badge-frame. The user's selections are applied to the user-defined image and displayed for preview in the badge editing canvas. When the user is satisfied with the custom badge, the user sends a save request. A processor applies the user-chosen theme and any other user-selected transformations to the user defined image and generates a custom badge. The custom badge may be saved for retrieval by the user. The custom badge may be utilized in a third party software product, web based product, or otherwise.

Other systems, methods, features, and advantages of the disclosure will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The following description of the drawings and the various system, method, and software product is not intended to limit the inventive system, methods and software product disclosed herein to one embodiment, but rather to enable any person skilled in the art of project management and/or software development to make and use the inventive system, method and software product.

DETAILED DESCRIPTION OF THE DRAWINGS

Figure 1:
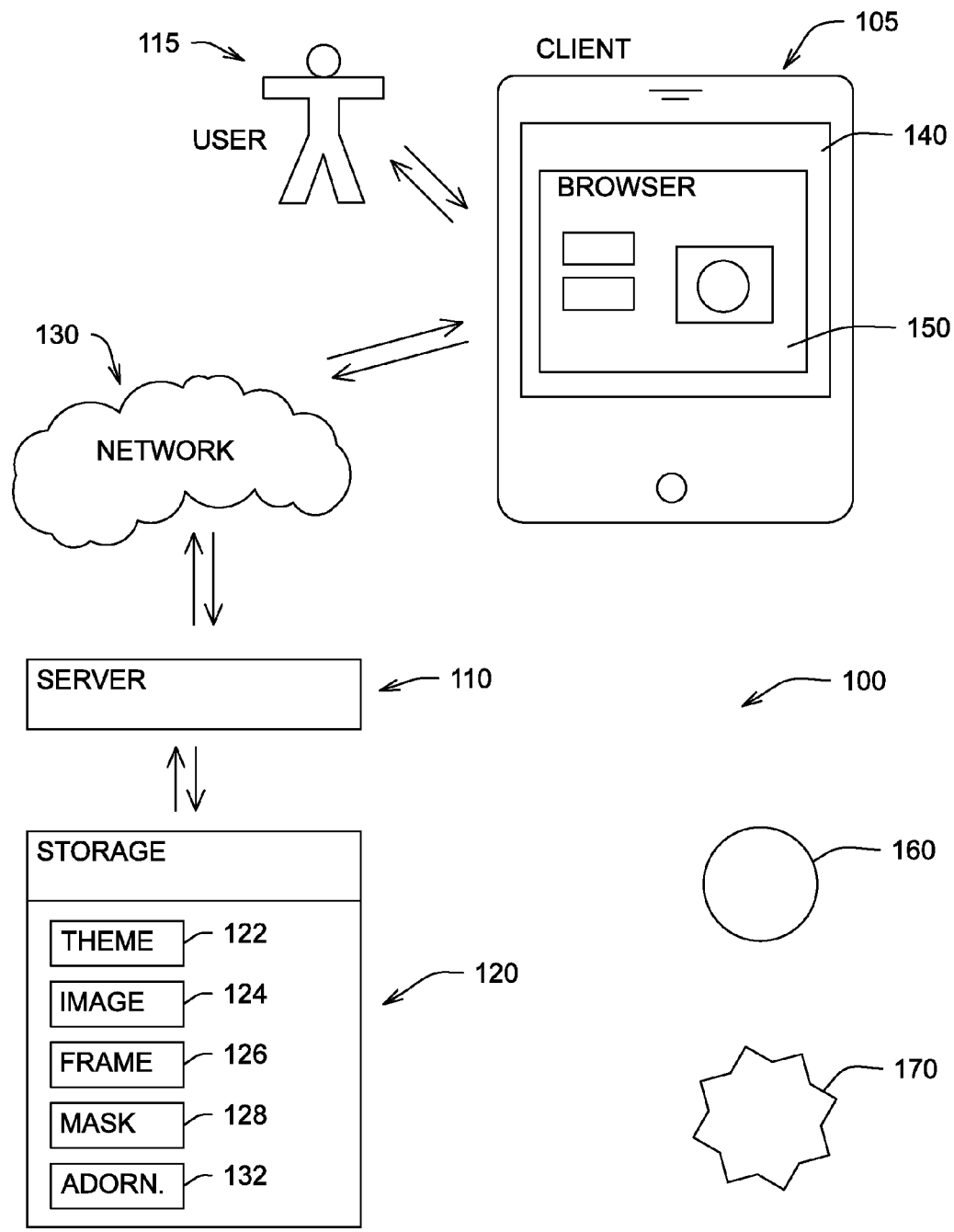
FIG. 1 is a diagram of an exemplary environment in which the system, methods and software product described herein may be implemented.

DEFINITIONS: unless stated to the contrary, for the purpose of the present disclosure the following terms shall have the following definitions:

A reference to "another variation" in describing an example does not imply that the referenced variation is mutually exclusive with another variation unless expressly specified.

The terms "a," "an" and "the" mean "one or more," unless expressly specified otherwise.

The phrase "at least one of" when modifying a plurality of things (such as an enumerate list of things) means any combination of one or more of those things, unless expressly specified otherwise.

The term "e.g." and like terms means "for example, but not limited to" and thus does not limit the term or phrase it explains.

The term "determining" and grammatical variants thereof is used in a broad sense. The term "determining" encompasses a wide variety of actions and therefore "determining" can include calculating, computing, processing, deriving, investigating, looking up (for example, looking up in a table, a database, or another data structure), ascertaining, and the like. Also, "determining" can include receiving (e.g., receiving information), accessing (e.g., accessing data in a memory) and the like. Determining may also include resolving, selecting, choosing, establishing and etc.

The term "herein" means "in this patent application including anything which may be incorporated by reference," unless otherwise specified.

The various processes described herein may be implemented by, e.g., a programmed general purpose computer and/or computing device. For example, a processor, (e.g., one or more microprocessors, one or more microcontrollers, one or more digital signal processors, and/or otherwise) may receive instructions (e.g., from a memory or like device), and execute those instructions, thereby performing one or more processes in the instructions.

A processor may mean, for example but not limited to, one or more microprocessors, central processing units (CPUs), computing devices, microcontrollers, digital signal processors, or like devices, and/or any combination thereof. The apparatus or device that implements a process or method described herein, may include, for example, any input devices and/or output devices appropriate to perform the process and/or method. Further, programs that implement processes and/or methods (as well as other types of data) may be stored and transmitted using a variety of medium (e.g., computer readable media) and in a variety of ways. Additionally or alternatively, various combinations of hardware and/or software may be used instead of software only. For example, hard-wired circuitry or custom hardware may be used in place of, or in combination with, some or all of the software instructions that, for example, have the ability to implement the processes of variations described herein.

We refer for simplicity to "storage device" (e.g., FIG. 1, 120) as a short hand for computer-readable medium. Computer-readable medium (and thus storage device 120) may refer to any medium that participates in providing data (e.g., instructions, data structures), which may be read by a computer, a processor, or other similar device. Such a medium may take many forms, including but not limited to, non-volatile media, volatile media, and transmission media. Non-volatile media may include, for example but not limited to, optical or magnetic disks and/or other persistent memory. Volatile media may include dynamic random access memory (DRAM). Computer readable media may also include, for example, non-transitory computer-readable medium, floppy disks, flexible disks, hard disks, magnetic tape, any other magnetic media, CD-ROM, DVD, any other optical medium, and any other memory chip or cartridge, or any other medium from which a computer can read.

Various forms of computer readable media may be involved in carrying data (e.g., sequences of instructions) to a processor. For example, data may be delivered from RAM to a processor, carried over a wireless transmission medium, formatted and/or transmitted according to one or more formats, standards, and/or protocols, such as but not limited to Ethernet, SAP, ATP, BLUETOOTH, TCP/IP, TDMA, CDMA, and/or 3G; and/or encrypted to ensure privacy or prevent fraud in any known way.

Various steps in a process do not indicate that all of the described steps are required or that the steps are required to be performed in the order described. Just as the description of various steps in a process does not indicate that all of the steps are required, all of the steps do not necessarily have to be performed on the same computer/computing device.

Where databases are described, it will be understood that alternative database structures to those described may be readily employed and that other memory structures other than databases may be readily employed. Any illustrations or descriptions of any sample databases represented herein are illustrative arrangements. Any number of other arrangements may be employed. Similarly, any illustrated entries of the databases represent (e.g., user data, badge data, task data) represent exemplary information only—the number and content of entries may be different from those described herein. Further, the database may have any format including relational databases, object-based models, and/or distributed databases. In addition, databases may be stored locally or remotely (e.g., cloud based or otherwise) from any device(s) which access data in the database.

The system, method and software product may be configured to work in various network environments, including but not limited to a computer that is in communication (e.g., via a communications network) with one or more devices. The computer may communicate with the devices directly or indirectly, via any wired or wireless medium. Each of the devices may themselves comprise computers or other computing devices that may or may not be adapted to communicate with the computer. Any number and type of devices may be in communication with the computer.

Interface may be any suitable type of network interface and/or local interface (e.g., an interface for programming and information retrieval), such as but not limited to any of the following: a keyboard, mouse and monitor; a mobile phone or smart phone; a tablet; a laptop; or otherwise.

The claimed subject matter is now described with reference to the drawings, wherein like reference numerals are generally used to refer to like elements throughout. In the following description, for the purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

We disclose a simplified method, system, and software product for creating custom badges, which may be utilized by users regardless of their level of graphic development skills. In one variation, the method, software product, and system may be accessed through a web browser. The method may facilitate the creation of visually consistent badges, for example, badges that have a consistent color scheme. The system may interact with third party applications and may allow the third party application to add custom badges to its functionality.

Many software applications, such as Four Square, Facebook, Twitter, and otherwise, allow users to display badges on user profiles, including as examples, coins, awards, and similar graphics. In every currently existing application, the user is limited to choosing badges created by the application developer (e.g., Four Square).

Existing applications do not offer users the ability to create custom badges. Rather, if a user, for example an individual, small business, or corporation, wishes to create a custom badge, the user must hire a graphic design professional and have the custom badge design created. This is a very expensive and time-consuming process. Some applications offer the ability to upload graphics into the system for display, for example, in some applications an area is provided into which a user can upload a picture of the user, but they do not support automatically transforming the uploaded graphic into a custom badge consistent in theme with, for example, the user's company branding scenario, the user's chosen color scheme, the user's existing badges, or otherwise. We provide a system and method for creating custom badges quickly and efficiently. In one variation the system and method automatically applies a consistent theme to the badges, without requiring advanced design skills. In another variation, the system and method may exist as a website which may be accessed by a user to develop custom badges for use in external systems (e.g., loaded into Four Square, Twitter, Sales Force, etc.).

Examples of Uses for System and Method

In one example, the method, software product and system for creating custom badges may be hosted on a server accessible through a website. An exemplary user may be a software developer. In one example, the software developer may be developing a call center application for a customer. The call center application may include the function of awarding, badges to call center employees based upon meeting performance goals. The software developer may use the disclosed system, software product and method for creating custom badges to use within the call center application.

In another example, the exemplary user may be a software developer. The software developer may be developing a sales tracking application for a customer. The sales tracking application may include the function of awarding badges to sales associates based upon meeting performance goals. The software developer may use the disclosed method, system, and/or software product for creating custom for use within the sales tracking application.

In another example, the exemplary user may be a corporate entity. The corporate entity may wish to issue badges to employees for meeting performance goals. Additionally or alternatively, the corporate entity may wish to issue to employees badges for meeting training goals. The corporate entity may use the disclosed method, system, and/or software product for creating custom badges for issuing to employees.

In another example, the exemplary user may be an individual. The individual may wish to create custom badges to send to friends for display on social media platforms.

The custom badges, regardless of why created, may be displayed on an employee's web based profile. There are many examples of web-based profiles for example but not limited to on LinkedIn, SalesForce, Twitter, Facebook, or a web-based profile on a company intranet site.

The Environment

Turning to FIG. 1, a diagram of an exemplary environment 100 in which systems, software programs and methods described herein may be implemented. Environment 100 may include one or more clients 105 connected to one or more servers 110 via a network 130. Environment 100 may include a storage device 120 (e.g., a computer readable medium which may be non-transitory computer-readable medium).

A user 115 may interact with the system through a user interface 140, displayed on the client 105. The user interface 140 may include a browser 150 which may display a badge-creating dashboard (see, e.g., FIG. 2, 200). The badge-creating dashboard 200 may also be utilized as a badge-editing dashboard.

Figure 3:
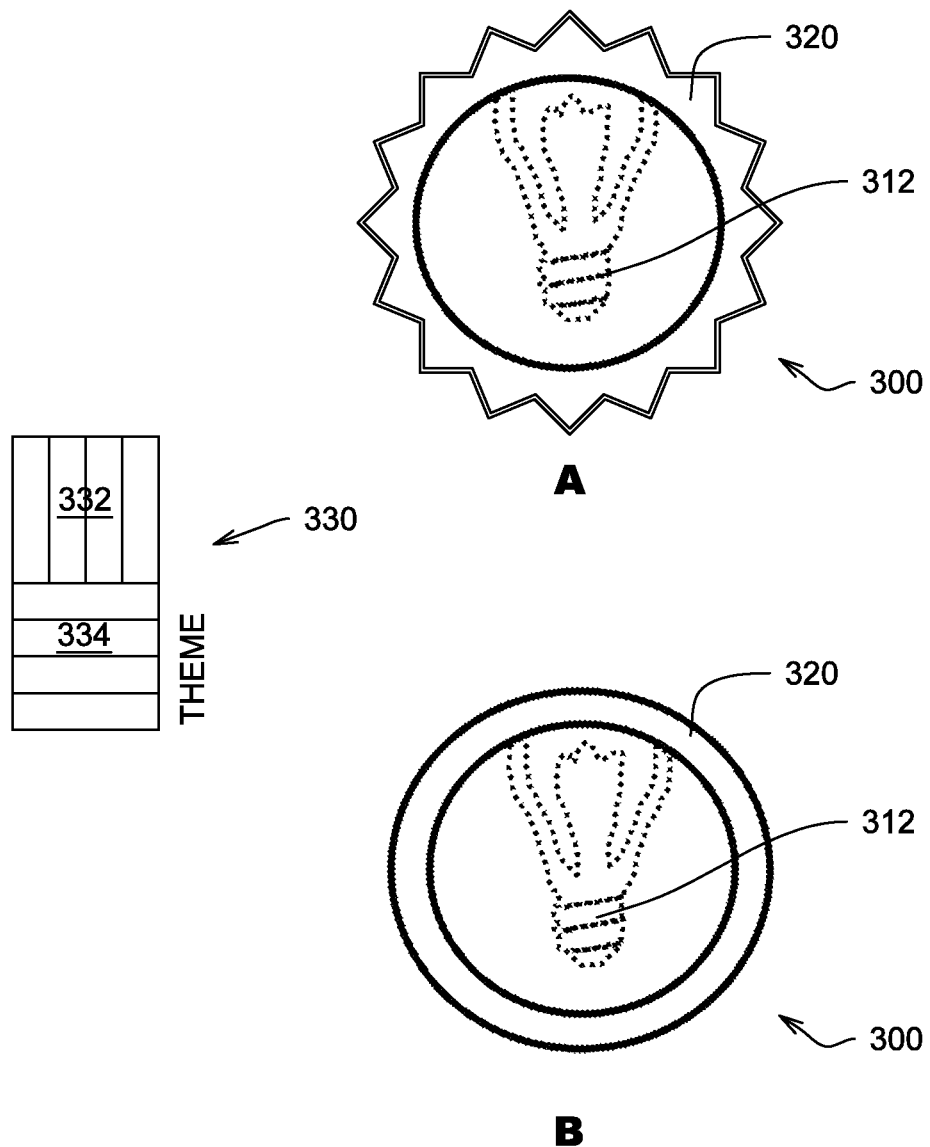
FIG. 3 is a diagram of exemplary badges, themes, and badge-frames.

The storage device 120 may include (among other data) theme data 122, image data 124, badge-frame data 126, mask data 128, adornment data 132, and transformation tool data. Badge-frame data 126 includes data representing various badge-frame designs. The user 115 may customize the shape of the custom badge (FIG. 3, 300) by choosing a badge-frame (FIG. 3, 320). The transformation tool data component includes data representing resizing and image reconfiguring options and may also include data regarding the physical transformation requests made by a user.

In general use, a user 115 may communicate with the system through the badge-creating dashboard (FIG. 2, 200), e.g., on the browser 150 of the user interface 140 of the client 105. The browser 150 may present the user 115 with a choice of badge-frame shapes. The overall shape of the custom badge (FIG. 3, 300) may be created by the badge-frame (FIG. 3, 320). For example, the user 115 may have the option of choosing to create a first variation badge 160 or a second variation badge 170. The client 105 will then request from the server 110, the appropriate badge-frame design from the badge-frame data 126 for creating the custom badge (FIG. 3, 300). For example, if the user 115 chooses to create a first variation badge 160, the user 115 will indicate their choice through the user interface 140 on the client's 105 browser 150. The client 105 will transmit the choice to the server 110. The server 110 will retrieve the badge-frame 320 design corresponding to the first variation badge 160 from the badge-frame data 126 located on the storage device 120. The server 110 may transfer the badge-frame 320 design corresponding to the first variation badge 160 to the appropriate location on the badge-editing dashboard (FIG. 2, 200) of the client 105, e.g., the badge editing canvas 210.

The server 110 may also retrieve from the storage device 120 a mask data file from the mask data 128. Once retrieved, the server 110 may send the elected files from the badge-frame data 124 the mask data 128 and any other data, (e.g., adornment data 132) to the client 105 browser 150 where it may be displayed e.g., on a badge-editing canvas (see FIG. 2, 210). The badge-editing canvas may also be utilized as a badge-creating canvas.

Figure 2:
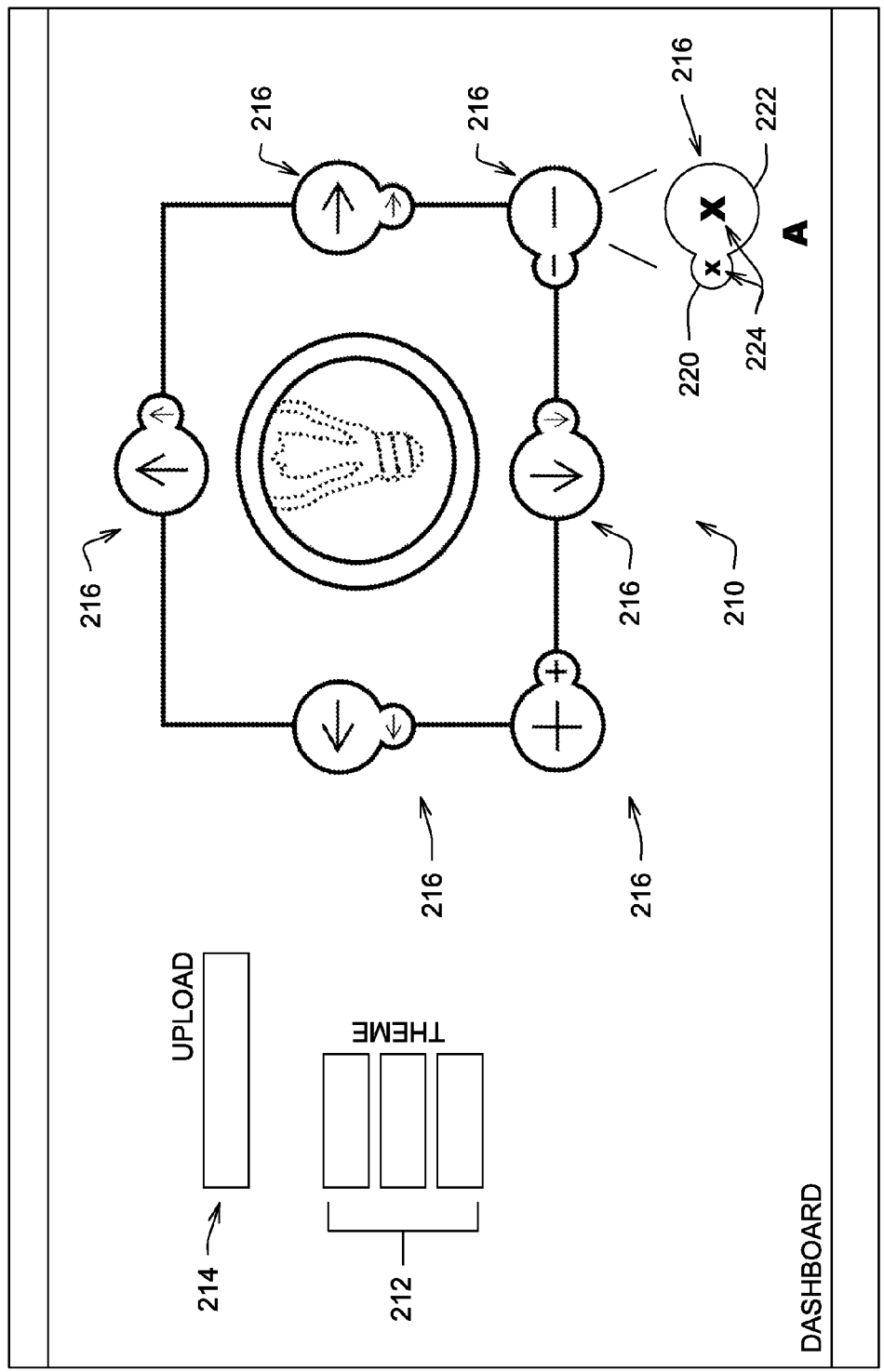
FIG. 2 is a diagram of an exemplary badge-creating dashboard.

The method and platform for creating custom badges may include a badge-creating dashboard, FIG. 2, 200. A user 115 may access the badge-creating dashboard FIG. 2, 200 through a web-browser (e.g. browser 150), through an application interface (e.g. user badge interface 140) on a handheld device or tablet (e.g., iPad®, iPod® Microsoft® Android® BlackBerry®), or otherwise through a client 105. The badge-creating dashboard (FIG. 2, 200) may present several tools for creating a customized badge (FIG. 3, 300).

FIG. 2 provides an exemplary badge-creating dashboard 200. The badge-creating dashboard 200 may include an badge-editing canvas 210, a theme selector 212, an image upload means 214, and image transformation tools 216.

An badge-creating dashboard 200 may also include a theme selector 212. The theme selector 212 may present to the user 115 several predefined themes 330, which may be color themes. The theme 330 may also include texture themes, pattern themes, and similar. However, color is used herein for simplicity.

A badge-creating dashboard 200 may also include an image upload means 214. The image upload means 214 may guide a user 115 through the steps of relocating an image file from the user's 115 client 105 to the system server 110.

Figure 5:
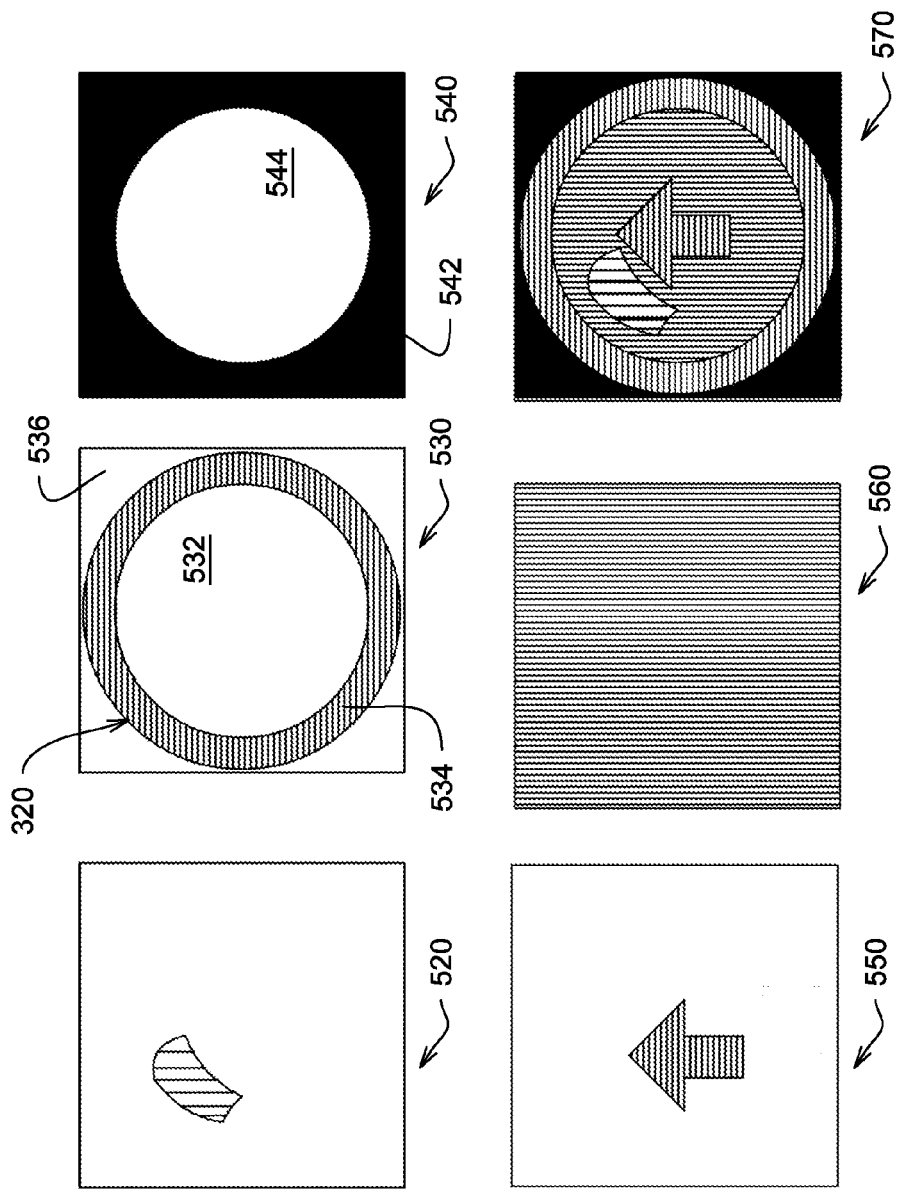
FIG. 5 illustrates exemplary functional layers of a badge editing canvas.

A badge-creating dashboard 200 may also include image transformation tools 216. Image transformation tools 216 may be indicated by arrows, addition signs, subtraction signs, or otherwise. The user 115 may interact with the image transformation tools 216 to manipulate an image (e.g., an image stored in an image file) uploaded into the image layer (FIG. 5, 550). The image transformation tools 216 allow the user 115 to select the portion of the user-defined image displayed in the badge-frame (FIG. 3, 320) of the custom badge (FIG. 3, 300). For example, a user 115 may move the image left, right, up or down relative to the graphic opening 532. The user 115 may also rotate the image or expand or shrink the image relative to the graphic opening 532. These transformations may be referred to collectively as physical transformations.

The image transformation tools 216 may include a first visual element 220 and a second visual element 222. In one example, the image transformation tool 216 is a tool for changing the size of the image. In this example, the first visual element 220 and the second visual element 222 may resemble adjoined circles. The first visual element 220 may appear as a smaller circle relative to the second visual element 222. The smaller size of the first visual element 220 may represent to the user that, when activated by the user, the effect of the first visual element 220 will be smaller than the effect of activating the second visual element 222.

Multiple forms of image transformation tools 216 may be present on the badge-creating dashboard 200. In addition to or alternative to a tool for changing the size of the image, image transformation tools 216 may include tools for relocating the image in the viewing panel. A function indicator element 224, is shown as an "X" inside of both the first visual element 220 and the second visual element 222. The function indicator element 224 may be a visual indicator of the action of the button (e.g., "+," "−," "→," "←," "↑," "↓").

The second visual element 222 may be relatively larger than the first visual element 220 and, when activated, may effectuate a larger editing effect, such as a larger degree of resizing (e.g., enlargement and/or reduction). In one variation, the second visual element 222 may resize the image by a whole number ratio, for example but not limited to: ~1 fold, ~2 fold, ~3 fold, ~4 fold, ~5 fold, ~6 fold, ~7 fold, ~8 fold, ~9 fold, ~10 fold, ~11 fold, ~12 fold, ~13 fold, ~14 fold, ~15 fold, ~16 fold, ~17 fold, ~18 fold, ~19 fold, ~20 fold, the degrees of resizing are merely illustrative. The first visual element, which may be relatively smaller than the second visual element 222, when activated by the user 115, may effectuate a smaller editing effect, such as a smaller degree of resizing (e.g., enlargement and/or reduction). In one variation, the first visual element 220 may resize the image by a partial number ratio, for example but not limited to, degrees of ~0.10 fold, ~0.20 fold, ~0.30 fold, ~0.40 fold, ~0.50 fold, ~0.60 fold, ~0.70 fold, ~0.80 fold, ~0.90 fold, resizing. In another variation, the first visual element 220 may resize the image by a partial number ratio, for example but not limited to, degrees of ~0.05 fold; ~0.15 fold, ~0.25 fold, ~0.35 fold, ~0.45 fold, ~0.55 fold, ~0.65 fold, ~0.75 fold, ~0.85 fold, ~0.95 fold, resizing. It will be understood from the disclosure herein that other partial number ratios are conceived.

The image transformation tools 216 may thereby allow precise levels of image editing, requiring little or no design skills, in a fraction of the time required by conventional image editing software.

Figure 4:
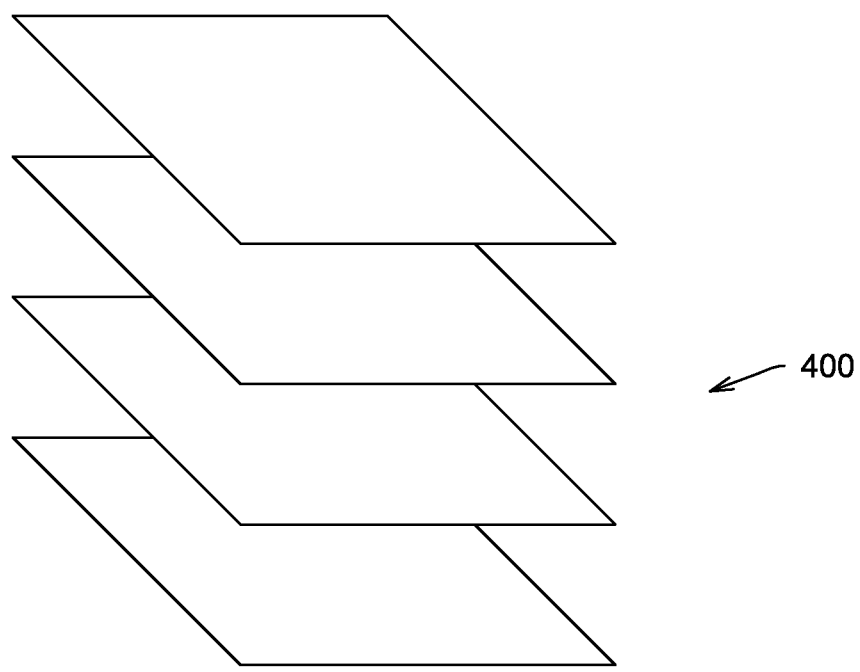
FIG. 4, is a diagram of an exemplary layer scheme for a badge editing canvas.

The badge-editing canvas 210 may serve as an input location, e.g., for the user 115 to input editing choices. The badge-editing canvas 210 may also serve as an output location, e.g., to display to the user 115 a preview the custom badge (FIG. 3, 300). The badge-editing canvas 210 may appear visually to be a single image but it may be made up of several image layers as shown in FIG. 4.

FIG. 3 illustrates elements of a custom badge 300 generated by the system, method and software product. A custom badge 300 may include a badge-frame 320 and a user-defined image 312. The badge-frame 320 may create the desired shape of the final custom badge 300, the image for which may be stored in badge-frame data 126. The user 115 may be presented with a selection of several badge-frames 320. While two exemplary custom badge shapes have been shown, see, e.g., FIGS. 1, 160 & 170 illustrated herein, badge-frames 320 may be offered in a multitude of shapes, for example but not limited to, circle, octagon, oval, square, shield, star, diamond, and otherwise. These shapes are so commonly known, therefore exhaustive drawings illustrating each is not deemed necessary for thorough understanding to one of skill in the art considering the disclosure herein.

Alternatively or additionally, the system, method, and software product may provide means for a user to select a badge-frame from other sources (e.g., self created, or found online or purchased). The badge-frame selected could then be uploaded into the badge-frame data element of the storage device 120 from which the processor may retrieve it and display it in the badge-frame options. The user-defined image 312 may be a graphic image derived from any uploaded picture, image, drawing, logo, or otherwise. The user-defined image 312 may be derived from an image file uploaded by the user 115. The image file may be uploaded by the user 115 in any known file format, e.g., .png, .jpeg, .pdf, .gif, .bmp, .tif.

The system, method and software product may permit the user 115 to apply a consistent theme 330 to create a custom badge 300. A theme 330 may consist of multiple elements. For example the theme 330 may include a first color element 334, and a second color element 332. In FIG. 3, we provide an example of the elements of a theme 330 applied to the example custom badge 300. A theme 330 may be represented, e.g., by a rectangle. A first color element 334 is herein indicated by horizontal lines. A second color element 332 is herein indicated by vertical lines. Themes 330 may be preloaded onto the storage device 120, e.g., in theme data 122.

Themes 330 may be two color, three color, four color, or otherwise. For simplicity, we use a theme 330 including two colors. However, one of skill in the art after reading this disclosure would understand how to adapt the system, method and software product to multiply color elements.

Theme 330 selection allows a user 115 to enforce visual consistency across custom badges 300. This may be advantageous for several reasons. A business may want to allow employees, developers, or otherwise to create custom badges 300, but may want to enforce visual consistency with business trade dress (e.g., Tiffany's® robin egg blue, Netflix® red, Facebook® blue, UPS® pullman brown). Alternatively or additionally, individuals may want to enforce visual consistency to show allegiance to a certain college or professional athletic team (e.g., Georgia Tech white and gold, Ohio State scarlet and grey, Wake Forest black and gold).

Under currently known methods, a user 115 wishing to match a signature color (e.g., for a company, a school, or otherwise as illustrated above) is faced with using a color selector. A user 115 will rely upon attempting to visually match the signature color (e.g., Martha Stewart® blue) against a myriad of selections on the color selector. This may create many inefficiencies. The color a user 115 sees on their browser 150 is influenced by many factors such as display properties and graphic card age and quality. Also, individuals each have unique visual spectrums and color viewing abilities. The disclosed system, method and software product ensures accuracy of color selection by preloading the themes 330 of the appropriate color profile onto the storage device 120 so that a user 115 is presented with the correct color theme 330, which may circumvent the user 115 having to struggle with a traditional color selector.

The theme selector FIG. 2, 212 on the badge-creating dashboard FIG. 2, 200 presents a selection of themes 330 to the user 115. This creates numerous efficiencies allowing the user 115 to simply choose appropriate colors from a drop down. Users 115 who do not have design experience (and even users 115 who do) do not, therefore, have to rely on their eye sight, research, or repeated trial and error to choose the correct color from a color picker, e.g., one implementing the HSB, CMYK, RGB or other models.

FIG. 4 demonstrates one example of how a badge-editing canvas 210 may be built of several image layers 400. The image layers may create the illusion that the viewer is viewing a composite image. Four layers are shown in FIG. 4, however, more or fewer layers may be employed.

FIG. 5 demonstrates one example of the multiple layers that might make up the badge-editing canvas 210. The layers may include a background layer 560, a mask layer 540, a badge-frame layer 530 an optional adornment layer 520, and a user image layer 550. Layers may be added as desired and/or layers may be combined to create the same effect.

A background layer 560 may be a solid color e.g., rendered in a browser 150 as html, displayed in the browser 150 as a block of color. The color of this layer may be, for example, a color component of a theme 330, for example the second color element 332 of the theme 330 chosen by the user 115; the first color element 334 of the theme 330 chosen by the user. It follows that, in themes with more than two colors, the background layer 560 may be any of the colors included in the theme 330. When the user 115 requests a different theme 330 selection, e.g., using the theme selector 212 of the badge-creating dashboard 200 the browser 150 (executing instructions saved on a storage device 120) applies a color included in the theme 330 selection to the background layer 560.

In this example, a user-selected image may become the user image layer 550. When a user 115 chooses an arbitrary image for creating a badge, the server 110 may load the arbitrary image to the user image layer 550 of the badge-editing canvas 210 on the client 105 browser 150.

The mask layer 540 may be stored on storage device 120. It may include a solid filled color 542. It may also include a transparent area 544. The mask layer 540 may be pre-designed and may reside in the storage device 120 or elsewhere.

The badge-frame layer 530 may include a badge image color component 534 and the badge-frame 320, among other elements. The badge-frame layer 530 may also include a graphic opening 532 through which the user-defined image 312 will be displayed, for example, in the preview view of the badge-editing canvas 210. The horizontal lines indicate the first color element 334 of the theme 330 selected by the user 115, as an example of how the colors included in a theme 330 may be applied to create a custom badge. It will be understood that other theme color components may be applied here—such as but not limited to a second color element 332 or a third or further component in themes including more than two colors. The badge image color component 534 may include a color, which may be e.g., a default color and/or the first color element 334 of the theme 330 selected by the user 115, depending on the stage of the method. The graphic opening 532 and/or the peripheral areas 536 may be transparent.

An adornment layer 520 may be used to create a highlight effect or overlay a graphic on top of the layers. The adornment layer 520 may be pre-designed and may reside in the storage device 120.

A tier of layers 570 may be displayed to the user 115 on the badge-editing canvas 210, e.g., to demonstrate to the user 115 the effect of the theme 330 selection and/or allow the user 115 to make further changes (e.g., change a theme 330, size of user 115 image, orientation of user 115 image, etc.). The layers e.g., 520, 530, 540, 550, 560, may be stacked one on another, to give the appearance to the user 115 that the user 115 is viewing a single image—representing a preview of the final custom badge FIG. 3, 300.

Figure 6:
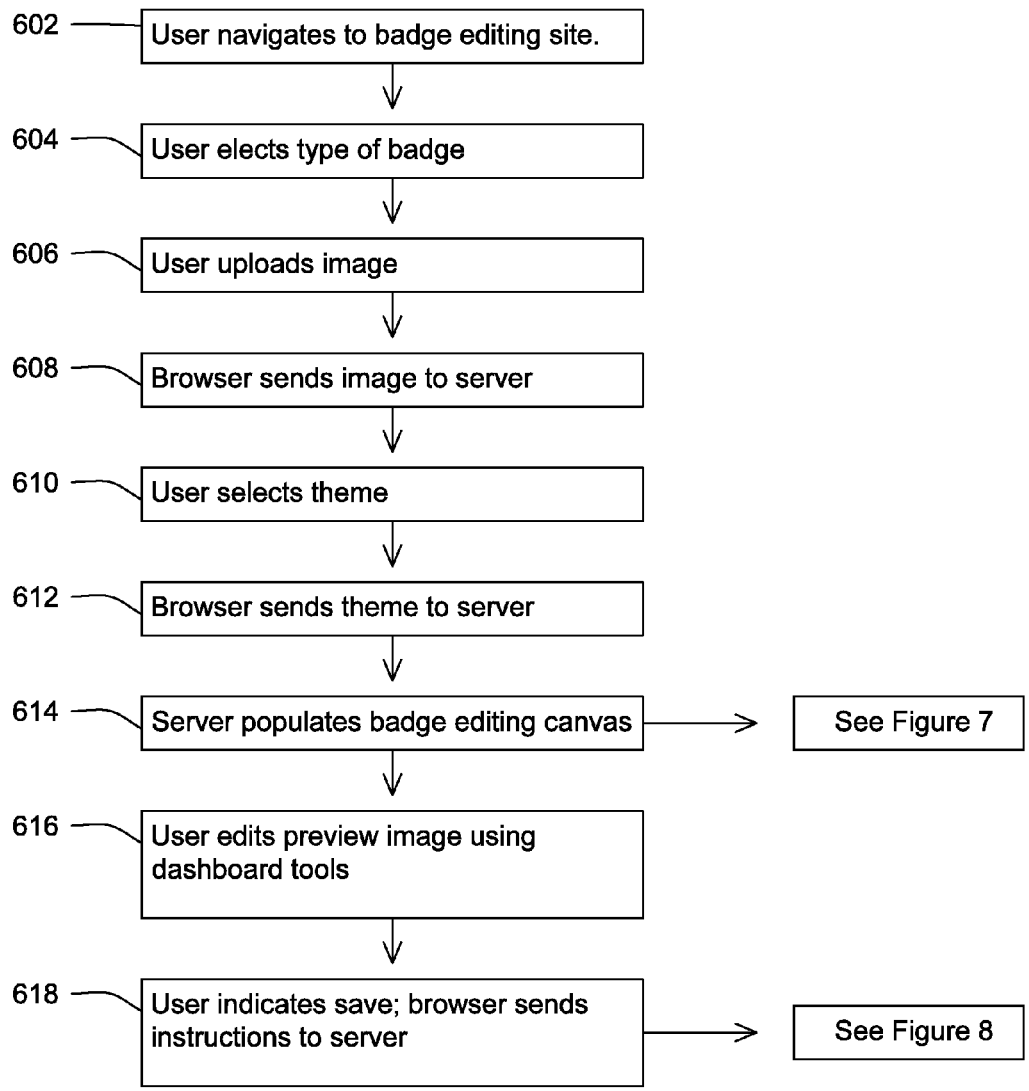
FIG. 6 is a flow chart of an exemplary system and method described herein.

Turning to FIG. 6, is a flow chart of an exemplary system, method and software product described herein. At block 602 a user 115 accesses the badge-creating dashboard 200, e.g., by navigating to a website or opening a locally stored application. The browser 150 displays to the user 115 the options of creating a custom badge 300. The user 115 elects the type of custom badge 300 to create (block 604). The user 115 may elect from several types of predetermined badge-frames 320, e.g., stored as badge-frame images in the image data 124 on the storage device 120. In this example, the user 115 may elect to create a first variation badge (FIG. 1, 160). The browser 150 sends the user's 115 selection of the badge-frame 320 to the server 110 (via a processor). The server 110 receives the badge-frame 320 selection. The server 110 transfers the appropriate badge-frame 320 to the badge-editing canvas 210. The server 110 may populate the badge-editing canvas 210 with the appropriate layers, e.g., by a process described in FIG. 7.

The user 115 uploads a user-defined image 312 into the badge-creating dashboard 200, (block 606) e.g., by using the image upload means 214. The user 115 may choose any image available to the user 115. For example, the user 115 can choose images for download from the Internet, can upload self-created images (e.g., digital pictures or graphics), or choose from images in an image database.

Figure 7:
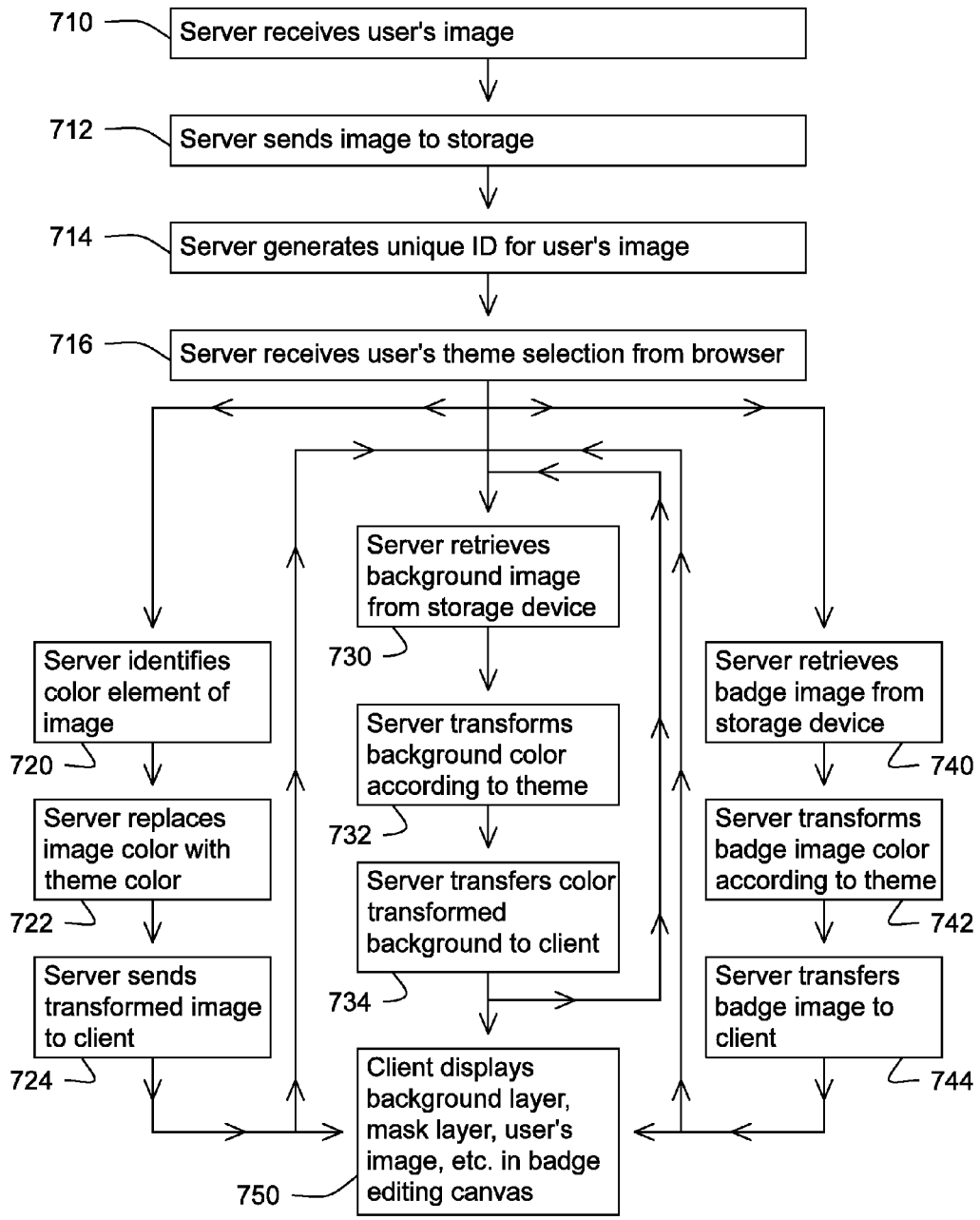
FIG. 7 is a flow chart of an exemplary system and method described herein.

The browser 150 may send the user-defined image 312 to the server 110 (block 608) for transformation and the server 110 may return the user-defined image 312 to the appropriate location on the badge-creating dashboard 200, e.g., by the process of FIG. 7. The user 115 may also at this time (or at a later time) indicate its theme 330 choice (block 610). For example, the badge-creating dashboard FIG. 2, 200 may present the user 115 with tools for choosing various themes 330 via a theme selector (FIG. 2, 212). The browser 150 may send the theme 330 selection to the server 110 (block 612).

Figure 8:
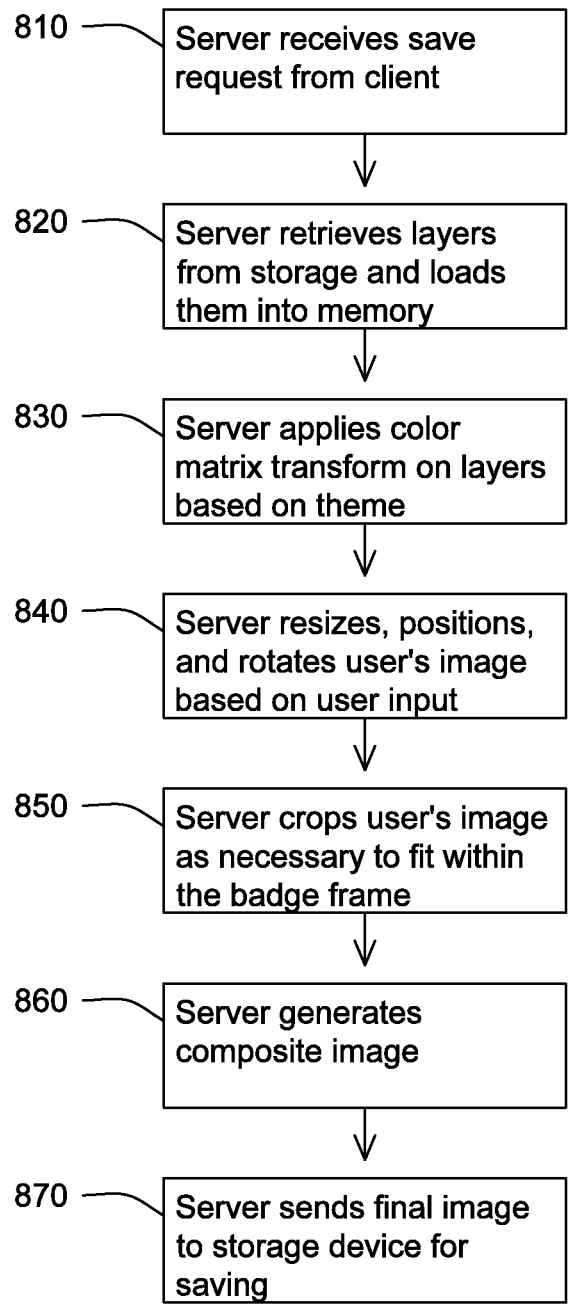
FIG. 8 is a flow chart of an exemplary system and method described herein.

The server 110 may receive from the browser 150, at least one of the users selections of badge-frame 320, theme 330, and the user-defined image 312. The server 110 may perform the necessary transforms requested by the browser 150 (See FIG. 7 and FIG. 8) and may populate the badge-editing canvas 210 (block 614) with a preview version of the custom badge 300, comprising a tier of layers (FIG. 5, 570). The user 115 may edit the preview image in the badge-creating dashboard 200 using image transformation tools 216 (block 616). The user 115 may edit the theme 330 and/or may perform physical transformations, e.g., rotate image, shrink image, enlarge image, or move image. When satisfied, the user 115 indicates "Save" and the browser 150 sends user 115 indicated instructions to the server 110 (block 618). Server 110 may finalize and save the image, e.g., as illustrated by FIG. 8.

FIG. 7, is a flow chart of an exemplary system, method and software product described herein. The server 110 may receive the user-defined image 312 from the client 105, e.g., as instructions from the browser 150 (block 710). The server 110 may send the user-defined image 312 to the storage device 120 for later retrieval (block 712). E.g., the server 110 may send the user-defined image 312 for storage in the image data 124. The server 110 may generate a unique ID for the user-defined image 312 (block 714). The server 110 may send the unique ID back to the browser 150. The server 110 may receive the user's 115 theme 330 selection from the browser 150 (block 716). For example, the user 115 may indicate a theme 330 or the browser 150 may request a standard sample theme, e.g., a user's last used theme 330 or otherwise, for the purpose of generating a preview for the user to edit.

The server 110, in sequence or in parallel, may use the browser 150 instructions regarding theme 330 and user-defined image 312, to prepare the layers (FIG. 5) of the badge-editing canvas (FIG. 2, 210). For example, the server 110 may prepare the user image layer 550. The server 110 may retrieve the user-defined image 312 from the storage device 120 (block 710). The server 110 may identify the color elements of the image (block 720) and the transparent elements of the image. The server 110 may replace the image color with the first color element 334 according to the chosen theme 330 (block 722). The server 110 may preserve the transparency. The server 110 may send the transformed user-defined image 312 to the client 105 (block 724). E.g., the server 110 may send the transformed user-defined image 312 to the user image layer 550 component of the badge-editing canvas (FIG. 2, 210).

The server 110 may prepare the background layer 560. The server 110 may retrieve a background layer image file from a storage device 120 (block 730). The server 110 may transform the color of the background image in the background layer 560 according to the theme 330 (block 732). E.g., the server 110 may transform the background image to the second color element 332 of the theme 330. The server 110 may transfer the color transformed background layer 560 to the client 105. E.g., the browser 150 may receive the transformed background layer 560. The browser 150 may load the background layer 560 into the background layer 560 component of the badge-editing canvas (FIG. 2, 210).

The server 110, may prepare the badge-frame layer 530. The server 110 may retrieve the image file including the selected badge-frame 320 from a storage device 120 (block 730). The server 110 may transform the badge image color component 534, badge-frame layer 530, according to the theme 330 (block 732). E.g., the server 110 may transform the badge image color component 534 to the foreground color element 334 of the theme 330. In another example, the server 110 may transform the badge image color component 534 to the second color element 332 of the theme 330. The server 110 may transfer the color transformed badge-frame layer 530 to the client 105. E.g., the browser 150 may receive the transformed badge-frame layer 530. The browser 150 may load the badge-frame layer 530 into the badge-frame layer 530 component of the badge-editing canvas (FIG. 2, 210).

The client 105 may receive from the server 110 the badge-frame layer 530, the mask layer 540, the user image layer 550, the background layer 560, and optionally the adornment layer 520. The client 105 may display the layers, e.g., as a tier of layers 570. The tier of layers 570 may be displayed in the badge-editing canvas 210. The browser 150, e.g., via the badge-editing canvas 210 incorporating the tier of layers 570 may present to the user 115 a preview image for further editing (block 750). The tier of layers 570 may represent the ordered stacking of the layers, e.g., the badge-frame layer 530, the mask layer 540, the user image layer 550, the background layer 560, and optionally the adornment layer 520. The client 105 may display the layers, e.g., as a tier of layers 570 and may give the appearance to the user 115 that the user 115 is seeing a single image. This may be achieved by the stacking of the colored and transparent regions in each layer, which when stacked, give the illusion of a consistent image, e.g., comprising a badge-frame 320 and an image transformed by a first color element 334 and second color element 332 according to the theme 330.

FIG. 8 is a flow chart of an exemplary system, method and software product described herein. The server 110 receives the save request from client 105 (block 810). The server 110 may retrieve the custom badge 300 components from storage device 120. The server 110 may load the custom badge 300 components into memory (block 820). For example, the custom badge 300 components may be preliminarily composed of multiple layers, e.g., the badge-frame layer 530, the mask layer 540, the user image layer 550, the background layer 560, and optionally the adornment layer 520. The server 110 may retrieve each of these layers, as necessary, from the storage device 120. The server 110 may transform the various layers according to the user-selected theme 330 (block 830). For example, the server 110 may perform the steps illustrated by FIG. 7, for preparing the layers for preview in the badge-editing canvas 210.

The server 110 may (in parallel or in sequence) resize, position, and rotate the user image layer 550 (or any other layer) according to the user's 115 choices (block 840) (e.g., as elected through the image transformation tool 216). E.g., the user 115 may indicate choices by utilizing the editing tools described above and displayed on the badge-creating dashboard 200. The client 105, e.g. via the browser 150, may send the user's 115 choices to the server 110. The server 110 may implement the instructions and thereby resize, position, and rotate the user image layer 550. The server 110 may optionally crop the user's 115 image as necessary to fit within the badge-frame 320 (block 850).

The server 110 may generate a composite image (block 860). For example, the server 110 may merge the various transformed layers e.g., the badge-frame layer 530, the mask layer 540, the user image layer 550, the background layer 560, and optionally the adornment layer 520 into a composite image. For example, the server 110 may combine various image layers to make a single final image of a custom badge 300 saved to a single image foe. The server 110 may send the final image to a storage device 120 for storage (block 870).

A method of customizing icons by a user, comprising the steps of: providing a computer processing means, a computer readable medium, a user interface; loading a user-defined image in a icon editing canvas component of a browser; recording one or more color theme transformations applied to the user-defined image using the computer processing means; recording one or more physical transformations applied to the user-defined image using the computer processing means; rendering an edited user-defined image using the computer processing means comprising the one or more color theme transformations and the one or more physical transformations; sending the edited user-defined image to the icon editing canvas component of the browser; sending a request to edit the user-defined image, upon a save request, the request comprising one or more color theme transformations and one or more physical transformations.

The theme comprising a first predetermined color and a second predetermined color.

The icon editing canvas comprising an icon layer an image layer, and a background layer.

The icon editing canvas further comprising an adornment layer.

The icon editing canvas rendering the edited user defined image comprising applying the first predetermined color to the icon layer.

The icon editing canvas rendering the edited user defined image comprising applying the first predetermined color to the background layer.

The icon editing canvas rendering the edited user defined image comprising applying the second predetermined color to the user defined image.

A method of customizing icons by a user, comprising the steps of: providing a computer processing means, a computer readable media, and a user interface; inputting theme data, comprising data representing at least one color theme, and storing the theme data on the computer readable media; inputting icon data, comprising at least one icon design, and storing the icon data on the computer readable; inputting mask data, including data representing at least one mask image, and storing the mask data on the computer readable media; providing an icon-editing dashboard, the icon-editing dashboard comprising at least one of an icon editing canvas and an icon transformation tool; displaying the icon-editing dashboard on a browser; receiving a user-defined image; storing the user-defined image on the computer readable media; receiving a request for the user-defined image; receiving a theme selection; applying the theme selection to the user-defined image to create a color transformed user-defined image and storing on the computer readable media; delivering the color transformed user-defined image from the computer readable media to the icon editing canvas; receiving image transformations requested by the user; transmitting image transformations requested by the user to the computer processing means; applying color scheme to user-defined image to create a color transformed image using the computer processing means; transferring color transformed image to the user interface; upon a commit to the edited version of the image; sending a request for a composite image to the computer processing means; generating the icon using the computer processing means, the computer processing means retrieving from the computer readable media the color scheme data, the icon data, the mask data, and the color transformed image and compositing the retrieved data into the icon.

A computer software product comprising a medium readable by a processor, the medium having stored thereon a set of instructions for creating a custom icon, comprising: a first sequence of instructions which, when executed by a processor, causes the processor to send an icon editing dashboard to a user interface; a second sequence of instructions which, when executed by a processor, causes the processor to receive from the browser a user selected color theme, a user selected image, and a user selected icon; a third sequence of instructions which, when executed by a processor, causes the processor to apply the user selected color theme to the user selected image creating a color transformed image; a fourth sequence of instructions which, when executed by a processor, causes the processor to deliver the color transformed image to the icon editing dashboard of the browser; a fifth sequence of instructions which, when executed by a processor, records a request to edit the user defined image; a sixth sequence of instructions which, when executed by a processor, renders the user-defined image applying the user selected color theme and the user selected icon.

An system generating a custom icon by a user comprising: (a) means for loading a user defined image in an icon editing canvas of a browser; (b) means for recording one or more color theme transformations applied to the user-defined image; (c) means for recording one or more physical transformations applied to the user-defined image; (d) means for rendering an edited user defined image comprising the one or more color theme transformations and the one or more physical transformations; (e) means for sending the edited user defined image to the icon editing canvas component of the browser; (f) upon a save request, means for generating a custom icon from the user defined image by applying the color theme transformation and the physical transformation.

A storage device, the storage device storing at least one frame image and at least one color theme. A processor configured to: receive an image file containing a color element and a white element; analyze the image to identify the color element and the white element; retrieve from the storage device a user selected color theme; the color theme comprising a first theme color component and a second theme color component; receive a user selected frame image; apply the color theme to the image file to generate a theme-modified image; combine the theme-modified image and frame image into a custom icon.

A system for generating custom icons, the system comprising: a means for receiving at least one user selected image, the at least one user selected image comprising a color element and a white element; a means for storing at least one theme; the at least one theme comprising a first color component and a second color component; a means for creating a theme transformed image by identifying the color element of the at least one user selected image and replacing the color element of the at least one user selected image with the first color component; a means for identifying the white elements of the theme transformed image and replacing the white elements of the at least one user selected image with a translucency; a means for layering the theme transformed image between an icon image layer and a background layer, the icon image comprising a framing image defining a translucent opening, the theme transformed image aligned such that it appears through the opening when viewed by a user; the background layer comprising the second color component and aligned such that it appears through the transparency of the theme transformed image when viewed by a user; upon a save command issued by a user; a means for generating a composite image file from the icon image layer, the icon layer, and the background layer.

A method for generating custom icons, the method comprising: providing a computer processing means, a computer readable medium, a user interface, and a means for a user to select at least one color theme; providing on the user interface an icon editing canvas, the icon editing canvas comprising an image layer, a background layer, and an icon layer; the icon layer comprising at least one of a badge icon and a certificate icon; the color theme comprising a first color and a second color; the background layer comprising the second color of the theme; receiving, by a processor and from a user, an image, the image comprising a color element and a white element; identifying, by the processor, the color element of the image; creating an image layer by replacing the color element of the image with the first color of the theme and replacing by the processor the white element of the image with a transparency to create a theme transformed image; sending the image layer to the icon editing canvas; upon a request for the image by a user, presenting to the user the icon editing canvas; upon a save request from the user, generating by the processor a composite image by compiling the image layer, the background layer, and the icon layer into a unitary image file; storing the image file on a computer readable medium.

The claims are not limited to the embodiments illustrated and described, as it also covers all equivalent implementations insofar as they do not depart from the spirit of the invention. Further, the invention is not yet limited to the combination of features as described herein but may be defined by any other combination of all of the individual features disclosed. Further, the invention is not yet limited to the sequence of method steps as described herein but may be defined by any other combination or order the steps disclosed. Any person skilled in the art will recognize from the previous detailed description and from the figures and claims that modifications could be made to the disclosed embodiments of the invention without departing from the scope of the invention.

The invention claimed is:

1. A method for enabling users to create graphically consistent badges, the method comprising:
   storing, on a server system, at least one background, a plurality of masks, and a plurality of frames, each background having a customizable fill element, each frame defining a shape that includes an inner perimeter and an outer perimeter, the shape having a customizable fill element, each mask having a transparent area surrounded by a filled perimeter, the transparent area of each mask having an outer perimeter that corresponds to the inner perimeter of one of the frames;
   storing, on the server system, a plurality of themes, each theme defining one or more fill parameters;
   presenting a badge-creating dashboard that includes a badge-editing canvas, a theme selector in which the plurality of themes are presented for user selection, an image provider by which the user can submit or select an image, and a frame selector in which the plurality of frames are presented for user selection, wherein the badge-editing canvas comprises a background layer, a mask layer, a frame layer, and an image layer;
   receiving user input via the badge-creating dashboard, the user input including a selection of a first theme, a selection of a first frame, and an upload or selection of a first image;
   in response to the user input, updating the badge-editing canvas by:
      populating the background layer with a first background, including applying a first fill parameter of the first theme to the customizable fill element of the first background;
      populating the frame layer with the first frame, including applying a second fill parameter of the first theme to the customizable fill element of the shape defined by the first frame;
      populating the mask layer with a first mask layer corresponding to the first frame such that the outer perimeter of the transparent area of the first mask is aligned with the inner perimeter of the first frame; and
      populating the image layer with the first image;
   receiving a request to create a custom badge from the populated layers of the badge-editing canvas; and
   in response to the request, creating the custom badge by combining a current contents of the populated layers into a single image, including rendering transparent any contents of the populated layers that are positioned beyond the outer perimeter of the shape defined by the first frame.

2. The method of claim 1, wherein the first and second fill parameters of the first theme are first and second colors.

3. The method of claim 1, wherein the badge-creating dashboard includes one or more controls for altering the size, position, or orientation of the first image within the image layer, the method further comprising:
   receiving user input to the one or more controls to alter the size, position, or orientation of the first image within the image layer such that the current contents of the populated layers includes the altered size or position of the first image.

4. The method of claim 1, wherein the badge-editing canvas also includes an adornment layer and wherein the user input includes a selection or upload of a first adornment such that updating the badge-editing canvas includes populating the adornment layer with the first adornment.

5. The method of claim 1, wherein the mask layer and the frame layer are layered on top of the image layer such that the first image is visible only within the inner perimeter of the shape defined by the first frame.

6. The method of claim 1, further comprising:
   prior to receiving the request to create the custom badge, receiving user input that selects a second theme; and
   in response to the selection of the second theme, applying a first fill parameter of the second theme to the customizable fill element of the first background and applying a second fill parameter of the second theme to the customizable fill element of the shape defined by the first frame.

7. The method of claim 1, further comprising:
   prior to receiving the request to create the custom badge, receiving user input that selects a second frame; and
   in response to the selection of the second frame, populating the frame layer with the second frame, including applying the second fill parameter of the first theme to the customizable fill element of the shape defined by the second frame.

8. The method of claim 1, wherein the first and second fill parameters of the first theme are the same.

9. The method of claim 1, further comprising:
   identifying, by the server, a color element of the first image; and
   applying a fill parameter of the first theme to the color element of the first image.

10. One or more non-transitory computer readable media storing computer executable instructions which when executed implement a method for enabling users to create graphically consistent badges, the method comprising:
   storing, on a server system, at least one background, a plurality of masks, and a plurality of frames, each background having a customizable fill element, each frame defining a shape that includes an inner perimeter and an outer perimeter, the shape having a customizable fill element, each mask having a transparent area surrounded by a filled perimeter, the transparent area of each mask having an outer perimeter that corresponds to the inner perimeter of one of the frames;
   storing, on the server system, a plurality of themes, each theme defining one or more fill parameters;
   presenting a badge-creating dashboard that includes a badge-editing canvas, a theme selector in which the plurality of themes are presented for user selection, an image provider by which the user can submit or select an image, and a frame selector in which the plurality of frames are presented for user selection, wherein the badge-editing canvas comprises a background layer, a mask layer, a frame layer, and an image layer;
   receiving user input via the badge-creating dashboard, the user input including a selection of a first theme, a selection of a first frame, and an upload or selection of a first image;

in response to the user input, updating the badge-editing canvas by:
applying a first fill parameter of the first theme to the customizable fill element of a first background;
populating the background layer with the first background;
applying a second fill parameter of the first theme to the customizable fill element of the shape defined by the first frame;
populating the frame layer with the first frame;
populating the mask layer with a first mask layer corresponding to the first frame such that the outer perimeter of the transparent area of the first mask is aligned with the inner perimeter of the first frame; and
populating the image layer with the first image;
receiving user input that modifies one or more of the populated layers of the badge-editing canvas;
receiving a request to create a custom badge from the populated layers of the badge-editing canvas; and
in response to the request, creating the custom badge by combining current contents of the populated layers.

11. The computer readable media of claim 10, wherein the user input that modifies one or more of the populated layers comprises user input that selects a second theme such that the current contents of the populated layers includes the first background with a first fill parameter of the second theme applied to the customizable fill element of the first background and the first frame with a second fill parameter of the second theme applied to the customizable fill element of the shape defined by the first frame.

12. The computer readable media of claim 10, wherein the user input that modifies the one or more of the populated layers comprises user input that selects a second frame such that the current contents of the populated layers includes the second frame with the second fill parameter of the first theme applied to the customizable fill element of the shape defined by the second frame.

13. The computer readable media of claim 10, wherein the user input that modifies the one or more of the populated layers comprises user input that selects a second image such that the current contents of the populated layers includes the second image.

14. The computer readable media of claim 10, wherein the user input that modifies the one or more of the populated layers comprises user input that alters a size, position, or orientation of the first image within the image layer such that the current contents of the populated layers includes the first image with the altered size, position, or orientation.

15. The computer readable media of claim 10, wherein combining the current contents of the populated layers comprises merging the contents of each populated layer into a single image and causing any contents of the populated layers that are positioned beyond the outer perimeter of the shape defined by the first frame to be transparent within the single image.

16. The computer readable media of claim 10, wherein each frame comprises a rectangular matrix of pixels and each pixel positioned outside of the outer perimeter is transparent.

17. The computer readable media of claim 10, wherein the first and second fill parameters of the first theme are first and second colors.

18. The computer readable media of claim 10, wherein the badge-editing canvas also includes an adornment layer and wherein the user input includes a selection or upload of a first adornment such that updating the badge-editing canvas includes populating the adornment layer with the first adornment.

19. A method for enabling users to create graphically consistent badges, the method comprising:
storing, on a server system, at least one background, a plurality of masks, and a plurality of frames, each background, mask, and frame comprising a rectangular matrix of pixel values, each background having a customizable fill element, each frame defining a shape that includes an inner perimeter and an outer perimeter, the shape having a customizable fill element, each mask having a transparent area surrounded by a filled perimeter, the transparent area of each mask having an outer perimeter that corresponds to the inner perimeter of one of the frames;
storing, on the server system, a plurality of themes, each theme defining one or more fill parameters;
presenting a badge-creating dashboard that includes a badge-editing canvas, a theme selector in which the plurality of themes are presented for user selection, an image provider by which the user can submit or select an image, and a frame selector in which the plurality of frames are presented for user selection, wherein the badge-editing canvas comprises a background layer, a mask layer, a frame layer, and an image layer;
receiving user input via the badge-creating dashboard, the user input including a selection of a first theme, a selection of a first frame, and an upload or selection of a first image;
in response to the user input, updating the badge-editing canvas by:
populating the background layer with a first background, including applying a first fill parameter of the first theme to the customizable fill element of the first background;
populating the frame layer with the first frame, including applying a second fill parameter of the first theme to the customizable fill element of the shape defined by the first frame;
populating the mask layer with a first mask layer corresponding to the first frame such that the outer perimeter of the transparent area of the first mask is aligned with the inner perimeter of the first frame; and
populating the image layer with the first image;
receiving a request to create a custom badge from the populated layers of the badge-editing canvas; and
in response to the request, creating the custom badge by combining a current contents of the populated layers into a single image comprising a rectangular matrix of pixel values, wherein each pixel value that is positioned beyond the outer perimeter of the shape defined by the first frame is rendered transparent in the single image.

20. The method of claim 19, wherein the badge-editing canvas also includes an adornment layer and wherein the user input includes a selection or upload of a first adornment such that updating the badge-editing canvas includes populating the adornment layer with the first adornment.

* * * * *